United States Patent
Shi et al.

(10) Patent No.: US 12,448,002 B2
(45) Date of Patent: Oct. 21, 2025

(54) VEHICLE TRAVELING CONTROL METHOD, ELECTRONIC DEVICE, STORAGE MEDIUM, CHIP AND VEHICLE

(71) Applicant: Xiaomi EV Technology Co., Ltd., Beijing (CN)

(72) Inventors: Liang Shi, Beijing (CN); Chi Zhang, Beijing (CN)

(73) Assignee: Xiaomi EV Technology Co., Ltd., Beijing (CN)

( * ) Notice: Subject to any disclaimer, the term of this patent is extended or adjusted under 35 U.S.C. 154(b) by 413 days.

(21) Appl. No.: 18/072,200

(22) Filed: Nov. 30, 2022

(65) Prior Publication Data

US 2023/0399020 A1 Dec. 14, 2023

(30) Foreign Application Priority Data

Jun. 14, 2022 (CN) .......................... 202210669421.8

(51) Int. Cl.
*B60W 60/00* (2020.01)
*B60W 30/095* (2012.01)

(52) U.S. Cl.
CPC .... *B60W 60/0015* (2020.02); *B60W 30/0956* (2013.01); *B60W 2554/4041* (2020.02); *B60W 2554/80* (2020.02)

(58) Field of Classification Search
CPC .............. B60W 30/09; B60W 30/095; B60W 30/0953; B60W 30/0956; B60W 40/103; B60W 40/107; B60W 50/0098; B60W 60/00; B60W 60/0015; B60W 60/00186; B60W 60/00272; B60W 2420/403; B60W 2510/0638; B60W 2510/18; B60W 2520/105; B60W 2520/12; B60W 2552/10; B60W 2554/4029; B60W 2554/4041; B60W 2554/80; B60W 2554/802; B60W 2554/804; B60W 2554/806;

(Continued)

(56) References Cited

U.S. PATENT DOCUMENTS

| 2016/0272172 | A1* | 9/2016 | Lee ........................... B60T 7/22 |
| 2019/0250622 | A1 | 8/2019 | Nister et al. |

(Continued)

FOREIGN PATENT DOCUMENTS

| CN | 110834631 A | 2/2020 |
| CN | 112581790 A | 3/2021 |

(Continued)

OTHER PUBLICATIONS

Extended European Search Report issued on May 15, 2023 for European Patent Application No. 22210585.0.

*Primary Examiner* — Peter D Nolan
*Assistant Examiner* — Ce Li Li
(74) *Attorney, Agent, or Firm* — Volpe Koenig

(57) ABSTRACT

A vehicle traveling control method, the method includes: determining predicted motion features of a to-be-avoided object within a perception visual field of a vehicle; determining a safety level of the to-be-avoided object relative to the vehicle according to the predicted motion features and preset safety conditions; and determining a target deceleration of the vehicle according to an attribute feature of the to-be-avoided object and the corresponding safety level, and controlling traveling of the vehicle according to the target deceleration.

18 Claims, 5 Drawing Sheets

Determine predicted motion features of a to-be-avoided object within a perception visual field of a vehicle, where the predicted motion features include at least one of the following: a position relationship between a current position of the to-be-avoided object and a traveling lane of the vehicle, whether there is a predicted traveling path intersection between the to-be-avoided object with the vehicle, and a predicted position of the to-be-avoided object at the time that the vehicle decelerates to the predicted traveling path intersection at a maximum deceleration in a case that the predicted traveling path intersection exists — S11

Determine a safety level of the to-be-avoided object relative to the vehicle according to the predicted motion features and preset safety conditions — S12

Determine a target deceleration of the vehicle according to an attribute feature of the to-be-avoided object and the corresponding safety level, and control traveling of the vehicle according to the target deceleration — S13

(58) Field of Classification Search
CPC ........ B60W 2556/10; B60W 2720/106; B60Y
2300/0952; G06V 20/58; G08G 1/166
See application file for complete search history.

(56) References Cited

U.S. PATENT DOCUMENTS

| | | | |
|---|---|---|---|
| 2021/0110484 A1 | 4/2021 | Shalev-Shwartz et al. | |
| 2022/0004747 A1* | 1/2022 | Yang | G06V 20/46 |
| 2022/0234578 A1* | 7/2022 | Das | G08G 1/166 |
| 2022/0397402 A1* | 12/2022 | Bolless | G01C 21/3415 |
| 2023/0182772 A1* | 6/2023 | Funke | G08G 1/167 |
| | | | 701/23 |

FOREIGN PATENT DOCUMENTS

| | | |
|---|---|---|
| CN | 113715814 A | 11/2021 |
| CN | 113734163 A | 12/2021 |
| CN | 113895459 A | 1/2022 |
| WO | 2020053612 A1 | 3/2020 |
| WO | 2020/250019 A1 | 12/2020 |

\* cited by examiner

VEHICLE TRAVELING CONTROL METHOD, ELECTRONIC DEVICE, STORAGE MEDIUM, CHIP AND VEHICLE

CROSS REFERENCE TO RELATED APPLICATIONS

The present application claims the benefit of priority to Chinese Application No. 2022106694218 filed on Jun. 14, 2022, the contents of which are incorporated herein by reference in their entireties for all purposes.

BACKGROUND

Vehicle automatic driving or assistant driving perceives surrounding environment in real time through sensors arranged on a vehicle, obtains obstacle information in the surrounding environment after information collected by each sensor is fused, and then perform automatic driving planning according to the obstacle information through a planning decision-making module.

SUMMARY

The disclosure provides a vehicle traveling control method, an electronic device, a storage medium, a chip and a vehicle.

According to a first aspect of an example of the disclosure, a vehicle traveling control method is provided, including:
  determining predicted motion features of a to-be-avoided object within a perception visual field of a vehicle, where the predicted motion features include at least one of the following: a position relationship between a current position of the to-be-avoided object and a traveling lane of the vehicle, whether there is a predicted traveling path intersection between the to-be-avoided object with the vehicle, and a predicted position of the to-be-avoided object at the time that the vehicle decelerates to the predicted traveling path intersection at a maximum deceleration in a case that the predicted traveling path intersection exists;
  determining a safety level of the to-be-avoided object relative to the vehicle according to the predicted motion features and preset safety conditions; and
  determining a target deceleration of the vehicle according to an attribute feature of the to-be-avoided object and the corresponding safety level, and controlling traveling of the vehicle according to the target deceleration.

According to a second aspect of an example of the disclosure, an electronic device is provided, including: a processor; and a memory for storing an executable instruction of the processor. The processor is configured to: determine predicted motion features of a to-be-avoided object within a perception visual field of a vehicle, where the predicted motion features include at least one of the following: a position relationship between a current position of the to-be-avoided object and a traveling lane of the vehicle, whether there is a predicted traveling path intersection between the to-be-avoided object with the vehicle, and a predicted position of the to-be-avoided object at the time that the vehicle decelerates to the predicted traveling path intersection at a maximum deceleration in a case that the predicted traveling path intersection exists; determine a safety level of the to-be-avoided object relative to the vehicle according to the predicted motion features and preset safety conditions; and determine a target deceleration of the vehicle according to an attribute feature of the to-be-avoided object and the corresponding safety level, and control traveling of the vehicle according to the target deceleration.

According to a third aspect of an example of the disclosure, a non-transitory computer readable storage medium is provided, and stores a computer program instruction. The program instruction, in response to being executed by a processor, implements steps of the vehicle traveling control method according to the first aspect.

According to a fourth aspect of an example of the disclosure, a chip is provided, including a processor and an interface. The processor is configured to read an instruction so as to execute the vehicle traveling control method according to the first aspect.

According to a fifth aspect of an example of the disclosure, a vehicle is provided. The vehicle includes the electronic device described in the second aspect, or includes the chip described in the fourth aspect.

It should be understood that the above general description and the following detailed description are merely illustrative and explanatory, and cannot limit the disclosure.

BRIEF DESCRIPTION OF THE DRAWINGS

Accompanying drawings here, which are incorporated in and constitute a part of this specification, illustrate examples consistent with the disclosure and together with the specification serve to explain the principles of the disclosure.

DETAILED DESCRIPTION

Examples will be illustrated in detail here, and instances of which are represented in accompanying drawings. When the following description refers to the accompanying drawings, the same number in the different accompanying drawings represents the same or similar elements unless otherwise indicated. The implementations described in the following examples do not represent all implementations consistent with the disclosure. On the contrary, the implementations are merely examples of an apparatus and method consistent with some aspects of the disclosure as detailed in the appended claims.

It should be noted that all actions of obtaining a signal, information or data in the disclosure are performed under the premise of complying with the corresponding data protection regulations and policies of the local country, and with authorization of the corresponding apparatus owner.

The disclosure relates to the technical field of vehicle engineering, in particular to a vehicle traveling control method and apparatus, a device, a medium, a chip and a vehicle.

In related art, a control strategy of the vehicle is planned according to all obstacles within a current perception range of the vehicle. However, for example, obstacles on other traveling lanes that do not affect traveling of the vehicle, and static obstacles located outside a traveling road will also be configured to plan the control strategy, which may lead to emergency braking of the vehicle, reducing vehicle traveling safety and a passenger riding experience feeling.

Figure 1:
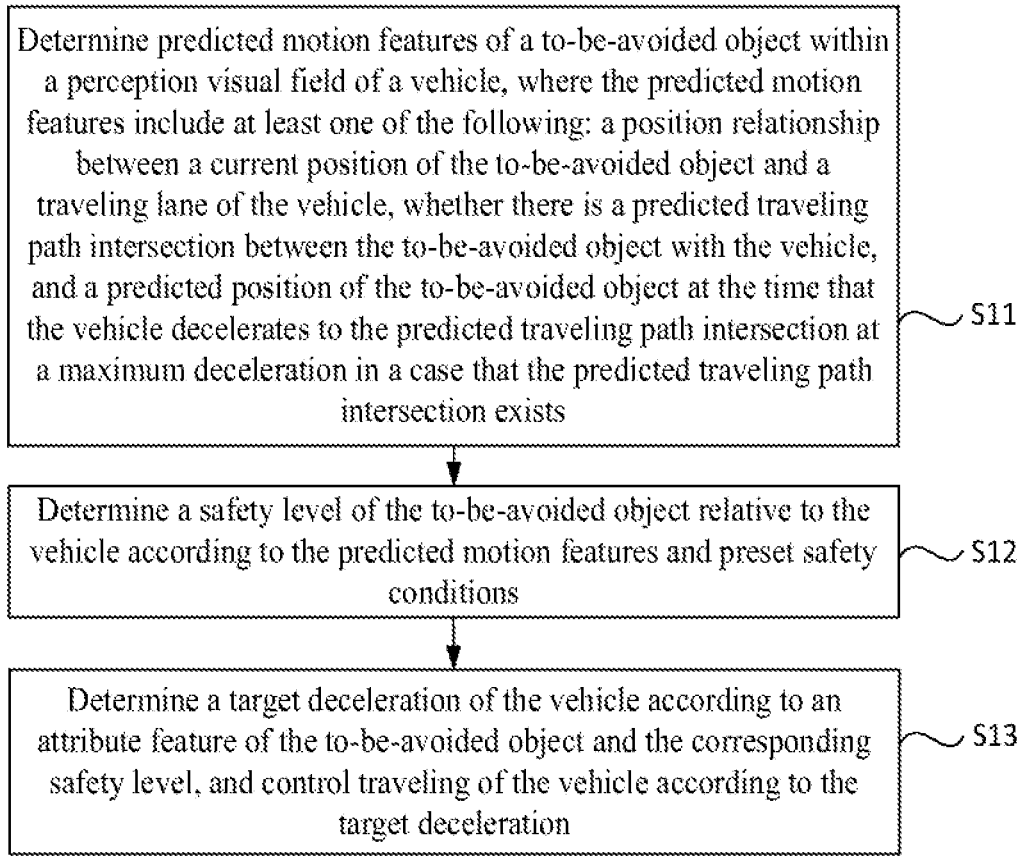
FIG. 1 is a flow diagram of a vehicle traveling control method shown according to an example.

FIG. 1 is a flow diagram of a vehicle traveling control method shown according to an example. As shown in FIG. 1, the method is applied in a vehicle-mounted control terminal, such as a vehicle controller or a controller of a driver assistance system. The method includes the following steps.

In step S11, predicted motion features of a to-be-avoided object within a perception visual field of a vehicle are determined. The predicted motion features include at least one of the following: a position relationship between a current position of the to-be-avoided object and a traveling lane of the vehicle, whether there is a predicted traveling path intersection between the to-be-avoided object with the vehicle, and a predicted position of the to-be-avoided object at the time that the vehicle decelerates to the predicted traveling path intersection at a maximum deceleration in a case that the predicted traveling path intersection exists.

The vehicle can predict the driving path of the object to be avoided and the vehicle, get the predicted driving path of the vehicle and the predicted driving path of the object to be avoided, and then determine whether there is an intersection point between the predicted driving path of the object to be avoided and the predicted driving path of the vehicle. This intersection point is the predicted driving path intersection.

In the example of the disclosure, the perception visual field of the vehicle refers to an effective collecting range of a sensor configured for the vehicle, such as an effective range of images collected by a camera shooting apparatus and an effective range of radar perception.

The to-be-avoided object in the example of the disclosure is not motor vehicles, but pedestrians and non-motor vehicles.

In step S12, a safety level of the to-be-avoided object relative to the vehicle is determined according to the predicted motion features and preset safety conditions. The determination of the safety level as performed in step S12 will be described later in greater detail.

The higher the safety level, the greater the impact on traveling of the vehicle, and the vehicle may need to make emergency braking. The lower the safety level, the less the impact on the traveling of the vehicle, and the vehicle may not need to make emergency braking. For example, a to-be-detected object with the lowest safety level may be ignored in this calculation. A to-be-detected object with the highest safety level may be avoided by decelerating at a preset comfortable deceleration. A to-be-detected object with the middle safety level may be subjected to related game calculation.

In step S13, a target deceleration of the vehicle is determined according to an attribute feature of the to-be-avoided object and the corresponding safety level, and traveling of the vehicle is controlled according to the target deceleration.

In an example of the disclosure, the attribute feature of the to-be-avoided object is determined according to images collected by the camera shooting apparatus. For example, the attribute feature may be an action ability of the to-be-avoided object, for example, the magnitude of the action ability of pedestrians may be determined. For example, the action ability of adults is greater than that of the elderly or minors.

The to-be-avoided object with the lower action ability and the lower safety level may be ignored in this calculation. The to-be-avoided object with the higher action ability and the higher safety level may be avoided by decelerating at the preset comfortable deceleration.

Safety decision-making levels are ranked for the different to-be-avoided objects, obstacles that have less impact on the safety of the vehicle but have greater impact on the body sense of drivers and passengers will be given a smaller safety level, and more consideration can be given to the impact of vehicle braking on the body sense of the drivers and passengers.

According to the above technical solution, the safety level of the to-be-avoided object relative to the vehicle is determined through the predicted motion features of the to-be-avoided object in the perception visual field and the preset safety conditions, and the target deceleration of the vehicle is determined according to the safety level, so that a to-be-avoided object with a long distance and not in a traveling lane of the vehicle may be prevented from being taken as a judgment object of emergency braking, situations such as the emergency braking of the vehicle may be avoided under the premise of safe traveling, and flexibility of vehicle obstacle avoidance and traveling stability are improved.

Figure 2:
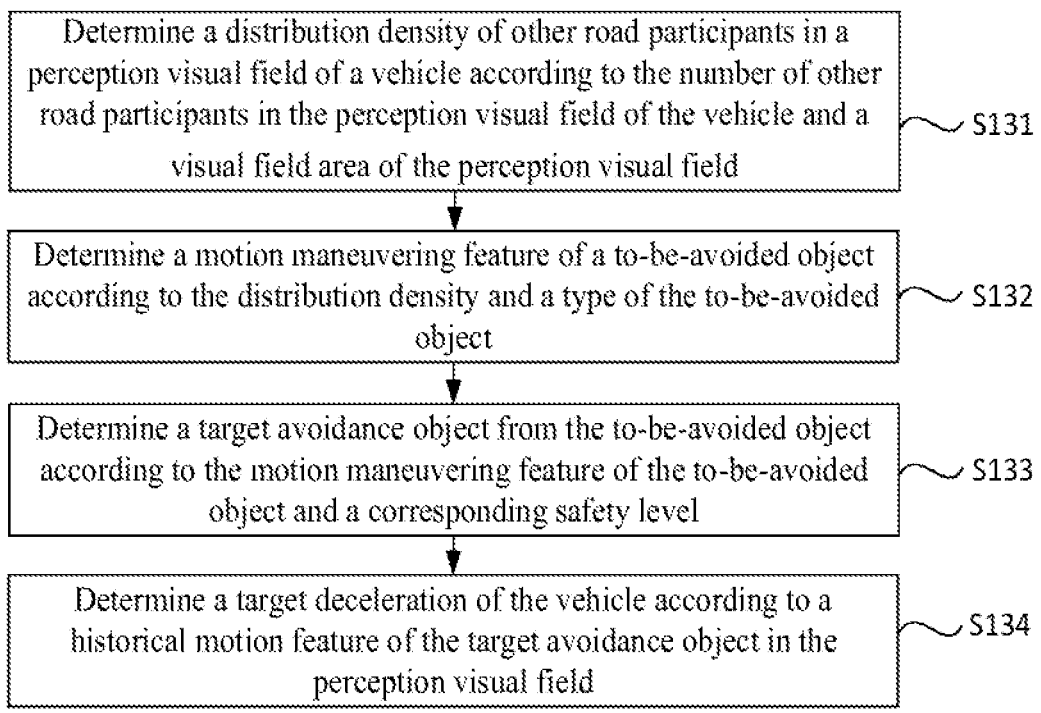
FIG. 2 is a flow diagram for implementing a step S13 in FIG. 1 shown according to an example.

On the basis of the above example, the attribute feature includes a type of the to-be-avoided object and a historical motion feature in the perception visual field. FIG. 2 is a flow diagram of implementing a step S13 according to an example. In step S13, determining the target deceleration of the vehicle according to the attribute feature of the to-be-avoided object and the corresponding safety level includes steps S131-S134.

In step S131, a distribution density of other road participants in the perception visual field of the vehicle is determined according to the number of other road participants in the perception visual field of the vehicle and a visual field area of the perception visual field.

In the example of the disclosure, other road participants within the perception visual field of the vehicle include motor vehicles, non-motor vehicles and pedestrians. The visual field area of the perception visual field is determined according to a size of the visual angle of the sensor and an effective collecting distance.

In step S132, a motion maneuvering feature of the to-be-avoided object is determined according to the distribution density and the type of the to-be-avoided object.

The motion maneuvering feature of the to-be-avoided object can characterize the level of motor ability of the to-be-avoided object.

In an example of the disclosure, the type of the to-be-avoided object may be pedestrians of different ages and non-motor vehicles of different types. Because the pedestrians of different ages have different acting abilities, their motion maneuvering features are also different. For example, younger pedestrians have the lower acting abilities, and their movement speed is lower in a case that the distribution density is larger, so it is determined that the motion maneuvering feature is lower maneuverability. Older pedestrians have the higher acting abilities, and their movement speed is higher in a case that the distribution density is smaller, so it is determined that the motion maneuvering feature is higher maneuverability.

Similarly, the different types of non-motor vehicles have the different driving capacities and the different motion maneuvering features as well. For example, the traveling capacity of a bicycle is less than that of an electric vehicle or a motorcycle.

In an example of the disclosure, the motion maneuvering feature of the to-be-avoided object is inversely proportional to the distribution density. The larger the distribution density is, the lower the motion speed of the to-be-avoided object can reach, and the lower the motion maneuvering feature of the to-be-avoided object is. The smaller the distribution density is, the higher the motion speed of the to-be-avoided object can reach, and the higher the motion maneuvering feature of the to-be-avoided object is.

Different calculation weights may be preset respectively according to the distribution density and the type of the to-be-avoided object, and then the motion maneuvering feature of the to-be-avoided object is determined through weighted sum according to a calculation weight, the distribution density and the type of the to-be-avoided object.

Referring back to FIG. 2, in step S133, a target avoidance object is determined from the to-be-avoided object according to the motion maneuvering feature of the to-be-avoided object and a corresponding safety level.

For example, a to-be-detected object whose motion maneuvering feature exceeds a preset threshold and whose corresponding safety level exceeds a preset safety level is taken as the target avoidance object. A to-be-detected object whose motion maneuvering feature does not exceed the preset threshold and whose corresponding safety level does not exceed the preset safety level is taken as a non-target avoidance object. A to-be-detected object whose motion maneuvering feature exceeds the preset threshold and whose corresponding safety level does not exceed the preset safety level or a to-be-detected object whose motion maneuvering feature does not exceed the preset threshold and whose corresponding safety level exceeds the preset safety level may be taken as an alternative avoidance object, and in the next collecting cycle, it is preferred to determine whether the alternative avoidance object meets a condition for being the target avoidance object.

In step S134, a target deceleration of the vehicle is determined according to a historical motion feature of the target avoidance object in the perception visual field.

In the example of the disclosure, the historical motion feature of the target avoidance object in the perception visual field may be, for example, a historical motion trajectory, historical acceleration and deceleration information, etc.

The target avoidance object has a larger impact on the traveling of the vehicle, and the vehicle may need emergency braking, while the non-target avoidance object has a smaller impact on the traveling of the vehicle, so emergency braking may not be performed, or even any avoidance measures may not be made.

The above technical solution is based on the selected target avoidance object for vehicle emergency braking, has a longer response time for the non-target avoidance object, and can expand more flexible decision-making and corresponding planning methods.

On the basis of the above example, in step S133, determining the target avoidance object from the to-be-avoided object according to the motion maneuvering feature of the to-be-avoided object and the corresponding safety level includes a target safety level where the to-be-avoided object is located is determined from a preset safety level according to the motion maneuvering feature of the to-be-avoided object and the corresponding safety level.

In an example of the disclosure, the target safety level of the to-be-avoided object may be determined by establishing a coordinate system. For example, the safety coordinate system is established with the target safety level as an abscissa, the motion maneuvering feature as an ordinate on a left side, and the safety level as an ordinate on a right side, and the target safety level where the to-be-avoided object is located is determined from the safety coordinate system according to the motion maneuvering feature of the to-be-avoided object and the corresponding safety level.

The target avoidance object is obtained by removing a to-be-avoided object whose target safety level is lower than a preset safety level threshold.

A to-be-avoided object whose target safety level is lower than the preset safety level threshold has less impact on the traveling of the vehicle and will not lead to emergency braking of the vehicle, and thus the to-be-avoided object whose target safety level is lower than the preset safety level threshold is removed. A to-be-avoided object whose target safety level is not lower than the preset safety level threshold has greater impact on the traveling of the vehicle and may lead to emergency braking of the vehicle, and thus the to-be-avoided object whose target safety level is not lower than the preset safety level threshold is taken as the target avoidance object.

On the basis of the above example, in step S132, determining the motion maneuvering feature of the to-be-avoided object according to the distribution density and the type of the to-be-avoided object includes:

a corresponding predicted moving speed is matched for the to-be-avoided object according to the distribution density and the type of the to-be-avoided object.

For example, in a case of the smaller distribution density, if the type of the to-be-avoided object is an adult, a larger predicted moving speed may be matched. In a case of the larger distribution density, if the type of the to-be-avoided object is the minor or the elderly, a smaller predicted moving speed may be matched.

For another example, if the type of to-be-avoided object is the non-motor vehicle, in the case of the smaller distribution density, the larger predicted moving speed may be matched; and in the case of the larger distribution density, the smaller predicted moving speed may be matched.

Visual angle information of the to-be-avoided object is determined according to a historical motion track of the to-be-avoided object in the perception visual field.

The historical motion track may determine a historical motion state of the to-be-avoided object relative to the vehicle. For example, the to-be-avoided object and the vehicle are moving in opposite directions, or in the same direction, or there is a certain included angle between the motion directions of the to-be-avoided object and the vehicle. Then a probability that the to-be-avoided object can find the vehicle may be determined.

The visual angle information may determine whether the to-be-avoided object can find the vehicle in time. If the visual angle information represents that a visual angle of the to-be-avoided object is toward the vehicle, then the probability that the to-be-avoided object finds the vehicle is larger. If the visual angle information represents that the visual angle of the to-be-avoided object is away from the vehicle, then the probability that the to-be-avoided object finds the vehicle is smaller.

The motion maneuvering feature of the to-be-avoided object is determined according to the predicted moving speed and the visual angle information.

If the larger the predicted moving speed is and the smaller the probability of finding the vehicle represented by the visual angle information is, the larger the motion maneuvering feature of the to-be-avoided object is. If the smaller the predicted moving speed is and the larger the probability of finding the vehicle represented by the visual angle information is, the smaller the motion maneuvering feature of the to-be-avoided object is.

On the basis of the above example, the preset safety conditions include at least one of the following: whether a current position of the to-be-avoided object is in the traveling lane of the vehicle, whether the to-be-avoided object has the predicted traveling path intersection with the vehicle, a distance between the predicted traveling path intersection and the vehicle in a case that the predicted traveling path intersection exists, whether a distance between the predicted position of the to-be-avoided object and the predicted traveling path intersection meets a preset safety distance at a time of the vehicle decelerating to the predicted traveling path intersection at the maximum deceleration in a case that the predicted traveling path intersection exists.

In a case that the current position of the to-be-avoided object is outside the traveling lane, it represents that even if the to-be-avoided object has the predicted traveling path intersection with the vehicle, the safety level of the to-be-avoided object relative to the vehicle is lower. The lower the safety level is, the smaller the impact on safe traveling is, and an automatic driving system has a longer response time, or a driver has a longer take-over reaction time.

In a case that the current position of the to-be-avoided object is within the traveling lane, it represents that if the to-be-avoided object has the predicted traveling path intersection with the vehicle, the relative safety level of the to-be-avoided object and the vehicle is higher. The higher the safety level is, the larger the impact on relative safe traveling is, and the response time of the automatic driving system, or the take-over reaction time of the driver is relatively short.

The response time of the automatic driving system, or the take-over reaction time of the driver may be further determined through a distance between the predicted traveling path intersection and the vehicle. For example, if the distance is less than 5 meters, it may be determined that the safety level of the to-be-avoided object is higher, the impact on safe traveling is larger, and emergency braking is needed. In a case that the distance is larger than 50 meters, it may be determined that the safety level of the to-be-avoided object is lower, and there is no need to brake to avoid the to-be-avoided object at present.

When the vehicle decelerates at the maximum deceleration, it is the emergency braking, which has a lower sense of driving experience. Thus in the case that the distance between the predicted position of the to-be-avoided object and the predicted traveling path intersection meets the preset safety distance, the deceleration of the decelerated traveling may be appropriately reduced, so that the deceleration of the vehicle continues to reduce until the moment that the vehicle decelerates at the calculated deceleration to the predicted traveling path intersection, the distance between the predicted position of the to-be-avoided object and the predicted traveling path intersection is at a critical point to meet a preset safety distance, and the deceleration at this time is determined as a comfortable deceleration.

On the basis of the above example, there are the plurality of predicted motion features and preset safety conditions. Referring back to FIG. 1, in step S12, determining the safety level of the to-be-avoided object relative to the vehicle according to the predicted motion features and the preset safety conditions includes: a safety score corresponding to the predicted motion feature is determined according to whether any predicted motion feature of the to-be-avoided object meets the corresponding safety condition; and the safety level of the to-be-avoided object relative to the vehicle is determined through weighted sum according to a weight value preset for each safety condition and the safety score.

The product of the weight value preset for each safety condition and the safety score corresponding to the predicted motion feature is calculated, and the safety level of the to-be-avoided object relative to the vehicle is obtained by summating the product.

Figure 3:
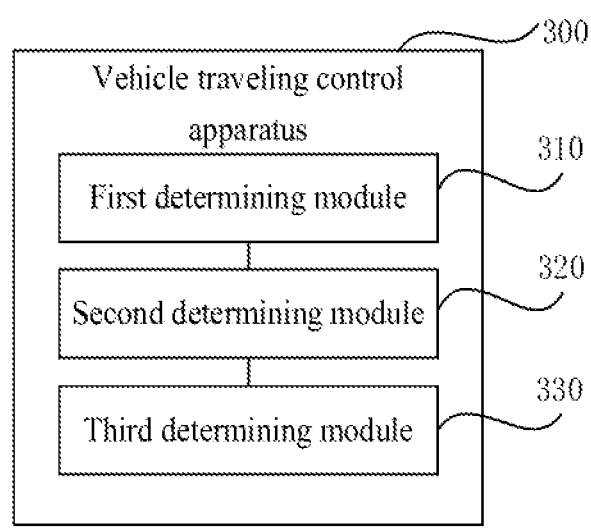
FIG. 3 is a block diagram of a vehicle traveling control apparatus shown according to an example.

Based on the same concept, FIG. 3 provides a vehicle traveling control apparatus 300 for executing part or all of the steps of the vehicle traveling control method provided by the above method examples. The apparatus 300 can implement the vehicle traveling control method in a manner of software, hardware or a combination of both. FIG. 3 is a block diagram of the vehicle traveling control apparatus shown according to an example. Referring to FIG. 3, the apparatus 300 includes: a first determining module 310, a second determining module 320 and a third determining module 330.

The first determining module 310 is configured to determine predicted motion features of a to-be-avoided object within a perception visual field of a vehicle. Where the predicted motion features include at least one of the following: a position relationship between a current position of the to-be-avoided object and a traveling lane of the vehicle, whether there is a predicted traveling path intersection between the to-be-avoided object with the vehicle, and a predicted position of the to-be-avoided object at the time that the vehicle decelerates to the predicted traveling path intersection at a maximum deceleration in a case that the predicted traveling path intersection exists.

The second determining module 320 is configured to determine a safety level of the to-be-avoided object relative to the vehicle according to the predicted motion features and preset safety conditions.

The third determining module 330 is configured to determine a target deceleration of the vehicle according to an attribute feature of the to-be-avoided object and the corresponding safety level, and control traveling of the vehicle according to the target deceleration.

Optionally, the attribute feature includes a type of the to-be-avoided object and a historical motion feature in the perception visual field, and the third determining module 330 includes a density determining submodule, a feature determining submodule, an object determining submodule, and a deceleration determining submodule.

The density determining submodule, configured to determine a distribution density of other road participants in the perception visual field of the vehicle according to the number of other road participants in the perception visual field of the vehicle and a visual field area of the perception visual field.

The feature determining submodule, configured to determine a motion maneuvering feature of the to-be-avoided object according to the distribution density and the type of the to-be-avoided object.

The object determining submodule, configured to determine a target avoidance object from the to-be-avoided object according to the motion maneuvering feature of the to-be-avoided object and the corresponding safety level.

The deceleration determining submodule, configured to determine the target deceleration of the vehicle according to a historical motion feature of the target avoidance object in the perception visual field.

Optionally, the object determining submodule is configured to determine a target safety level where the to-be-avoided object is located from a preset safety level according to the motion maneuvering feature of the to-be-avoided object and the corresponding safety level, and obtain the target avoidance object by removing a to-be-avoided object whose target safety level is lower than a preset safety level threshold.

Optionally, the feature determining submodule is configured to: match a corresponding predicted moving speed for the to-be-avoided object according to the distribution density and the type of the to-be-avoided object; determine visual angle information of the to-be-avoided object according to a historical motion track of the to-be-avoided object in the perception visual field; and determine the motion maneuvering feature of the to-be-avoided object according to the predicted moving speed and the visual angle information.

Optionally, the preset safety conditions include at least one of the following: whether a current position of the to-be-avoided object is in the traveling lane of the vehicle, whether the to-be-avoided object has the predicted traveling path intersection with the vehicle, a distance between the predicted traveling path intersection and the vehicle in a case that the predicted traveling path intersection exists, whether a distance between the predicted position of the to-be-avoided object and the predicted traveling path intersection meets a preset safety distance at a time of the vehicle decelerating to the predicted traveling path intersection at the maximum deceleration in a case that the predicted traveling path intersection exists.

Optionally, there are the plurality of predicted motion features and preset safety conditions, and the second determining module 320 is configured to: determine a safety score corresponding to the predicted motion feature according to whether any predicted motion feature of the to-be-avoided object meets the corresponding safety condition; and determine the safety level of the to-be-avoided object relative to the vehicle through weighted sum according to a weight value preset for each safety condition and the safety score.

As for the apparatus in the above examples, the specific modes for executing operations by all the modules have been described in the examples related to the method in detail, which is not illustrated in detail here.

In addition, it is worth noting that, for the convenience and simplicity of description, the examples described in the specification belong to preferred examples, and the parts involved are not necessarily necessary for the disclosure. For example, the second determining module 320 and the third determining module 330 may be either mutually independent apparatuses or the same apparatus during specific implementation, which is not limited in the disclosure.

According to an example of the disclosure, an electronic device is further provided, including: a processor; and a memory for storing an executable instruction of the processor. The processor is configured to determine predicted motion features of a to-be-avoided object within a perception visual field of a vehicle, where the predicted motion features include at least one of the following: a position relationship between a current position of the to-be-avoided object and a traveling lane of the vehicle, whether there is a predicted traveling path intersection between the to-be-avoided object with the vehicle, and a predicted position of the to-be-avoided object at the time that the vehicle decelerates to the predicted traveling path intersection at a maximum deceleration in a case that the predicted traveling path intersection exists The processor is further configured determine a safety level of the to-be-avoided object relative to the vehicle according to the predicted motion features and preset safety conditions, and determine a target deceleration of the vehicle according to an attribute feature of the to-be-avoided object and the corresponding safety level, and control traveling of the vehicle according to the target deceleration.

According to an example of the disclosure, a computer readable storage medium is further provided, and stores a computer program instruction. The program instruction, in response to being executed by a processor, implements steps of the vehicle traveling control method according to any one above.

Figure 4:
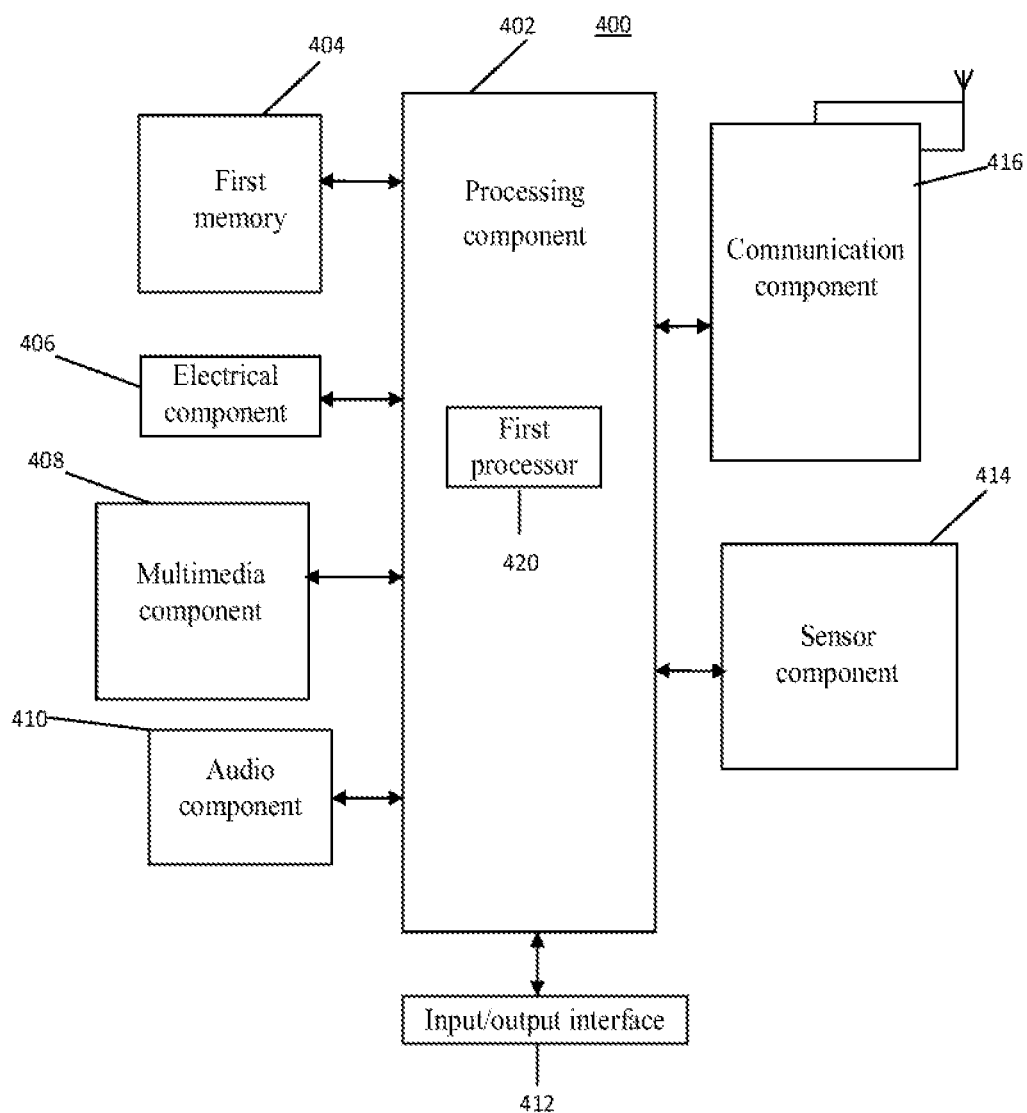
FIG. 4 is a block diagram of an apparatus for vehicle traveling control shown according to an example.

FIG. 4 is a block diagram of an apparatus 400 for vehicle traveling control shown according to an example. For example, the apparatus 400 may be configured as a vehicle controller or a driver assistant system.

Referring to FIG. 4, the apparatus 400 may include one or more of the following components: a processing component 402, a first memory 404, an electrical component 406, a multimedia component 408, an audio component 410, an input/output interface 412, a sensor component 414, and a communication component 416.

The processing component 402 usually controls an overall operation of the apparatus 400, such as operations associated with displaying, data communication, a camera operation and a record operation. The processing component 402 may include one or more first processors 420 to execute an instruction, so as to complete all or part of steps of the above vehicle traveling control method. In addition, the processing component 402 may include one or more modules, so as to facilitate interaction between the processing component 402 and other components. For example, the processing component 402 may include a multimedia module, so as to facilitate interaction between the multimedia component 408 and the processing component 402.

The first memory 404 is configured to store various types of data so as to support operations on the apparatus 400. Examples of these data include instructions of any application program or method used to be operated on the apparatus 400, contact data, telephone directory data, messages, pictures, videos, and the like. The first memory 404 may be implemented by any type of volatile or nonvolatile storage device or their combinations, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic disk or an optical disk.

The electrical component 406 provides electric power for various components of the apparatus 400. The electrical component 406 may include a power management system, one or more power sources, and other components associated with generating, managing and distributing electric power for the apparatus 400.

The multimedia component 408 includes a screen providing an output interface between the apparatus 400 and a user. In some examples, the screen may include a liquid crystal display (LCD) and a touch panel (TP). If the screen includes the touch panel, the screen may be implemented as a touch screen so as to receive an input signal from the user. The touch panel includes one or more touch sensors to sense touching, swiping and gestures on the touch panel. The touch sensor may not only sense a boundary of a touching or swiping action, but also detect duration and pressure related to the touching or swiping operation. In some examples, the multimedia component 408 includes a front camera and/or a back camera. When the apparatus 400 is in an operation mode, such as a shooting mode or a video mode, the front camera and/or the back camera may receive external multimedia data. Each front camera and each back camera may be a fixed optical lens system or have a focal length and optical zooming capability.

The audio component 410 is configured to output and/or input an audio signal. For example, the audio component 410 includes a microphone (MIC). When the apparatus 400 is in an operation mode, such as a call mode, a recording mode or a speech recognition mode, the microphone is configured to receive an external audio signal. The received audio signal may be further stored in the first memory 404 or sent via the communication component 416. In some examples, the audio component 410 further includes a speaker for outputting the audio signal.

The input/output interface 412 provides an interface between the processing component 402 and a peripheral interface module, and the above peripheral interface module may be a keyboard, a click wheel, buttons, etc. These buttons may include but are not limited to: a home button, a volume button, a start button and a lock button.

The sensor component 414 includes one or more sensors for providing state evaluations of all aspects for the apparatus 400. For example, the sensor component 414 may detect a turn-on/turn-off state of the apparatus 400 and relative positioning of components, for example, the components are a display and a keypad of the apparatus 400. The sensor component 414 may further detect position change of the apparatus 400 or one component of the apparatus 400, whether there is contact between the user and the apparatus 400, azimuth or speed up/speed down of the apparatus 400, and temperature change of the apparatus 400. The sensor component 414 may include a proximity sensor, which is configured to detect existence of a nearby object without any physical contact. The sensor component 414 may further include an optical sensor, such as a CMOS or CCD image sensor, for use in imaging application. In some examples, the sensor component 414 may further include an acceleration sensor, a gyroscope sensor, a magnetic sensor, a pressure sensor or a temperature sensor.

The communication component 416 is configured to facilitate wired or wireless communication between the apparatus 400 and other devices. The apparatus 400 may have access to a wireless network based on a communication standard, such as WiFi, 2G, 3G, 4G or 5G, or their combination. In an example, the communication component 416 receives a broadcast signal or broadcast related information from an external broadcast management system via a broadcast channel. In an example, the communication component 416 further includes a near-field communication (NFC) module so as to facilitate short-range communication. For example, the NFC module may be implemented based on a radio frequency identification (RFID) technology, an infrared data association (IrDA) technology, an ultra wide band (UWB) technology, a Bluetooth (BT) technology and other technologies.

In the example, the apparatus 400 may be implemented by one or more application specific integrated circuits (ASICs), digital signal processor (DSPs), digital signal processing devices (DSPDs), programmable logic devices (PLDs), field-programmable gate arrays (FPGAs), controllers, microcontrollers, microprocessors or other electronic elements for executing the above vehicle traveling control method.

In the example, a non-temporary computer readable storage medium including an instruction is further provided, such as a first memory 404 including an instruction. The above instruction may be executed by a first processor 420 of the apparatus 400 so as to complete the above vehicle traveling control method. For example, the non-temporary computer readable storage medium may be an ROM, a random access memory (RAM), a CD-ROM, a magnetic tape, a floppy disk, an optical data storage device and the like.

According to an example of the disclosure, a chip is further provided, including a processor and an interface. The processor is configured to read an instruction so as to execute the vehicle traveling control method according to any one above.

In addition to being an independent electronic device, the above apparatus may also be a part of an independent electronic device. For example, in one example, the apparatus may be an integrated circuit (IC) or a chip, in which the integrated circuit may be one IC, or a collection of the plurality of ICs. The chip may include but is not limited to the following categories: a graphics processing unit (GPU), a central processing unit (CPU), a field programmable gate array (FPGA), a digital signal processor (DSP), an application specific integrated circuit (ASIC), a system on chip (SOC), etc. The above integrated circuit or chip can be configured to execute an executable instruction (or a code) to implement the above vehicle traveling control method. The executable instruction may be stored in the integrated circuit or the chip, or may be obtained from other apparatuses or devices. For example, the integrated circuit or the chip includes a processor, a memory, and an interface for communicating with other apparatuses. The executable instruction may be stored in the processor, and the above vehicle traveling control method may be implemented when the executable instruction is executed by the processor; or, the integrated circuit or the chip may receive the executable instruction through the interface and transmit it to the processor for executing, so as to implement the above vehicle traveling control method.

According to an example of the disclosure, a vehicle is further provided, including the vehicle traveling control apparatus described above, or including the electronic device described above, or the chip described above.

Figure 5:
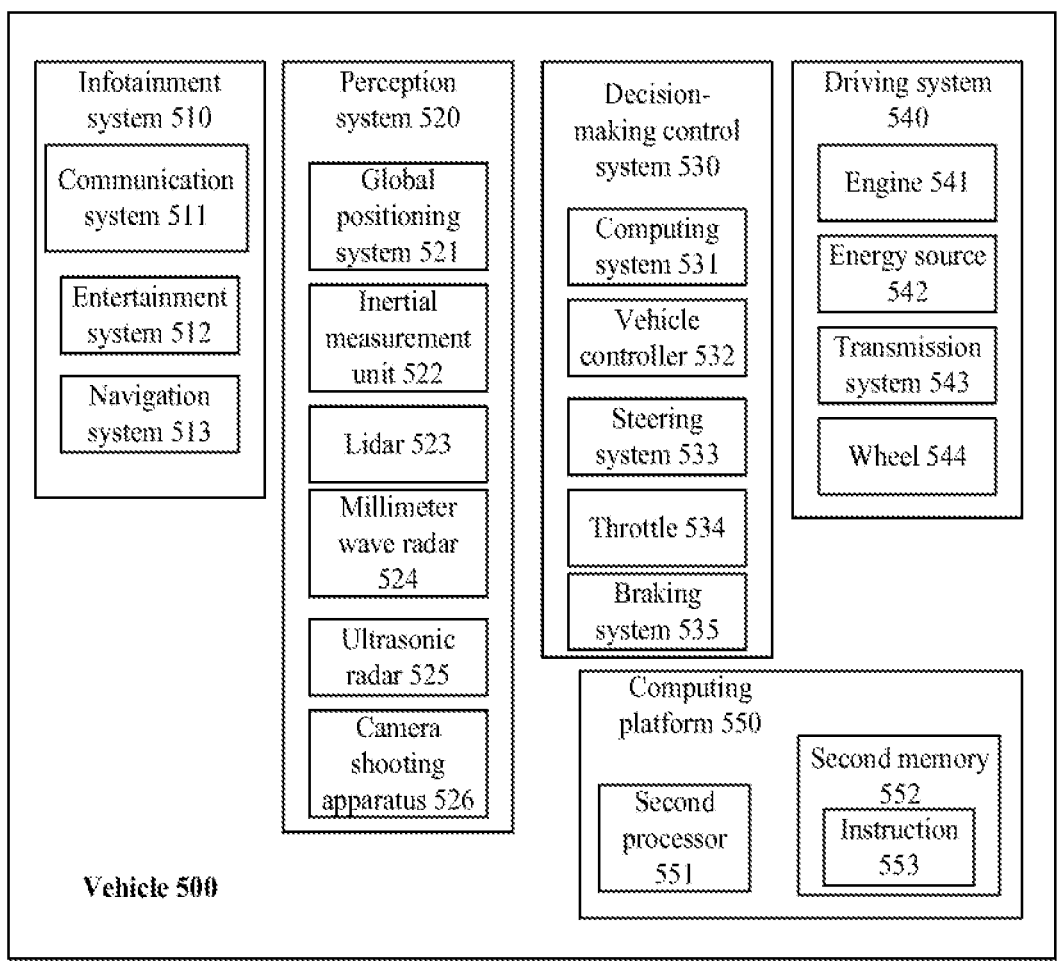
FIG. 5 is a schematic diagram of a functional block diagram of a vehicle shown according to an example.

Referring to FIG. 5, FIG. 5 is a schematic diagram of a functional block diagram of a vehicle 500 shown according to an example. The vehicle 500 may be configured in a fully or partially automatic driving mode. For example, the vehicle 500 may obtain surrounding environment information through a perception system 520, and obtain an automatic driving strategy based on analysis of the surrounding environment information so as to realize fully automatic driving, or present an analysis result to a user so as to realize partial automatic driving.

The vehicle 500 may include various subsystems, such as an infotainment system 510, a perception system 520, a decision-making control system 530, a driving system 540, and a computing platform 550. Optionally, the vehicle 500 may include more or less subsystems, and each subsystem may include a plurality of parts. Additionally, each of the subsystems and parts of the vehicle 500 may be interconnected in a wired or wireless manner.

In some examples, the infotainment system 510 may include a communication system 511, an entertainment system 512, and a navigation system 513.

The communication system 511 may include a wireless communication system, and the wireless communication system may wirelessly communicate with one or more devices, either directly or via a communication network. For example, the wireless communication system may use 3G cellular communication such as CDMA, EVD0, GSM/GPRS, or 4G cellular communication such as LTE, or 5G cellular communication. The wireless communication system may communicate with a wireless local area network (WLAN) by using WiFi. In some examples, the wireless communication system may communicate directly with the device by using an infrared link, Bluetooth, or ZigBee. Other wireless communication protocols, such as various vehicle communication systems, for example, the wireless communication system may include one or more dedicated short range communications (DSRC) devices, and these devices may include public and/or private data communication between the vehicle and/or a roadside station.

The entertainment system 512 may include a display device, a microphone and a speaker, and a user may listen to radio and play music in the vehicle based on the entertainment system; or a mobile phone is connected with the vehicle to realize screen projection of the mobile phone on the display device, the display device may be a touch-control type display device, and the user may operate by touching a screen.

In some cases, a speech signal of the user may be obtained through the microphone, and some control over the vehicle 500 by the user, such as adjusting a temperature in the vehicle, may be implemented according to the analysis of the speech signal of the user. In some other cases, the music may be played to the user through the speaker.

The navigation system 513 may include a map service provided by a map provider, so as to provide navigation of a traveling route for the vehicle 500. The navigation system 513 may cooperate with a global positioning system 521 and an inertial measurement unit 522 of the vehicle for use. The map service provided by the map provider may be a two-dimensional map or a high-precision map.

The perception system 520 may include several types of sensors that sense information about surrounding environment of the vehicle 500. For example, the perception system 520 may include a global positioning system 521 (the global positioning system may be a GPS system, a Beidou system or other positioning systems), an inertial measurement unit (ICU) 522, a lidar 523, a millimeter wave radar 524, an ultrasonic radar 525 and a camera shooting apparatus 526. The perception system 520 may further include sensors of an internal system of the monitored vehicle 500 (for example, an in-vehicle air quality monitor, a fuel gauge, an oil temperature gauge, etc.). Sensor data from one or more of these sensors may be configured to detect an object and its corresponding properties (a position, a shape, orientation, a speed, etc.). This detection and identification is a key function for a safe operation of the vehicle 500.

The global positioning system 521 is configured to estimate a geographic location of the vehicle 500. The inertial measurement unit 522 is configured to sense a pose change of the vehicle 500 based on inertial acceleration. In some examples, the inertial measurement unit 522 may be a combination of an accelerometer and a gyroscope.

The lidar 523 uses laser light to sense objects in an environment where the vehicle 500 is located. In some examples, the lidar 523 may include one or more laser sources, laser scanners, one or more detectors, and other system components.

The millimeter wave radar 524 uses a radio signal to sense the objects within the surrounding environment of the vehicle 500. In some examples, in addition to sensing the objects, the millimeter wave radar 524 may further be configured to sense a speed and/or heading direction of the objects. The ultrasonic radar 525 may sense the objects around the vehicle 500 by using an ultrasonic signal.

The camera shooting apparatus 526 is configured to capture image information of the surrounding environment of the vehicle 500. The camera shooting apparatus 526 may include a monocular camera, a binocular camera, a structured light camera, a panoramic camera, etc., and the image information obtained by the camera shooting apparatus 526 may include a static image or video stream information.

The decision-making control system 530 includes a computing system 531 for analyzing and making decisions based on the information obtained by the perception system 520, and the decision-making control system 530 further includes a vehicle controller 532 for controlling a power system of the vehicle 500, and a steering system 533, a throttle 534 and a braking system 535 for controlling the vehicle 500.

The computing system 531 is operable to process and analyze various information obtained by the perception system 520, so as to identify a target, the objects and/or features in the surrounding environment of the vehicle 500. The target may include pedestrians or animals, and the objects and/or features may include a traffic signal, a road boundary, and an obstacle. The computing system 531 may use technologies such as an object identification algorithm, a structure from motion (SFM) algorithm, and video tracking. In some examples, the computing system 531 may be configured to draw a map for the environment, track the objects, estimate the speed of the objects, and the like. The computing system 531 may analyze various obtained information and derive a control strategy for the vehicle.

The vehicle controller 532 may be configured to coordinately control a power battery and an engine 541 of the vehicle to improve power performance of the vehicle 500. The steering system 533 is operable to adjust the heading direction of the vehicle 500. For example, in one example, it may be a steering wheel system. The throttle 534 is configured to control an operating speed of the engine 541 and thus control the speed of the vehicle 500.

The braking system 535 is configured to control the vehicle 500 to decelerate. The braking system 535 may use frictional force to slow wheels 544. In some examples, the braking system 535 may convert kinetic energy of the wheels 544 into an electrical current. The braking system 535 may also take other forms to slow a rotational speed of the wheels 544 so as to control the speed of the vehicle 500.

The driving system 540 may include components that provide powered motion for the vehicle 500. In one example, the driving system 540 may include the engine 541, an energy source 542, a transmission system 543, and the wheels 544. The engine 541 may be an internal combustion engine, an electric motor, an air compression engine, or other types of engine combinations, such as a hybrid engine composed of a gasoline engine and the electric motor, and a hybrid engine composed of an internal combustion engine and an air compression engine. The engine 541 converts the energy source 542 into mechanical energy.

Examples of the energy source 542 include gasoline, diesel, other petroleum-based fuels, propane, other compressed gas-based fuels, ethanol, a solar cell panel, a battery, and other sources of electricity. The energy source 542 may also provide energy for other systems of the vehicle 500.

The transmission system 543 may transmit mechanical power from the engine 541 to the wheels 544. The transmission system 543 may include a gearbox, a differential, and a drive shaft. In one example, the transmission system 543 may further include other devices, such as a clutch. The drive shaft may include one or more axles that may be coupled to the one or more wheels 544.

Part or all of the functions of the vehicle 500 are controlled by the computing platform 550. The computing platform 550 may include at least one second processor 551, and the second processor 551 may execute an instruction 553 stored in a non-transitory computer-readable medium such as a second memory 552. In some examples, the computing platform 550 may further be a plurality of computing devices that control individual components or subsystems of the vehicle 500 in a distributed manner.

The second processor 551 may be any conventional processor, such as a commercially available CPU. Alternatively, the second processor 551 may further include, for example, a graphic process unit (GPU), a field programmable gate array (FPGA), a system on a chip (SOC), an application specific integrated chip (ASIC) or their combination. Although FIG. 5 functionally illustrates the processor, the memory, and other elements of a computer in the same block, those skilled in the art should understand that the processor, the computer, or the memory may actually include the plurality of processors, computers or memories that may or may not be stored within the same physical enclosure. For example, the memory may be a hard drive or other storage medium located within an enclosure other than the computer. Thus, reference to the processor or computer will be understood to include reference to a collection of the processors or computers or memories that may or may not operate in parallel. Different from using a single processor to execute the steps described here, some components, such as a steering component and a deceleration component, may each have their own processor, and the processor merely execute computations related to component-specific functions.

In the implementation of the disclosure, the second processor 551 may execute the above vehicle traveling control method.

In various aspects described here, the second processor 551 may be located away from the vehicle and in wireless communication with the vehicle. In other aspects, some of the processes described here are executed on a processor disposed in the vehicle, while others are executed by a remote processor, including taking steps necessary to execute single maneuver.

In some examples, the second memory 552 may contain an instruction 553 (for example, program logic), and the instruction 553 may be executed by the second processor 551 to execute various functions of the vehicle 500. The second memory 552 may also contain an additional instruction, including an instruction for sending data to, receiving data from, interacting with, and/or controlling one or more of the infotainment system 510, the perception system 520, the decision-making control system 530, and the driving system 540.

In addition to the instruction 553, the second memory 552 may further store data such as road maps, route information, vehicle positions, directions, speeds, and other such vehicle data, and other information. Such information may be used by the vehicle 500 and the computing platform 550 during operation of the vehicle 500 in autonomous, semi-autonomous, and/or manual modes.

The computing platform 550 may control the functions of the vehicle 500 based on inputs received from various subsystems (for example, the driving system 540, the perception system 520, and the decision-making control system 530). For example, the computing platform 550 may utilize input from the decision-making control system 530 in order to control the steering system 533 to avoid obstacles detected by the perception system 520. In some examples, the computing platform 550 is operable to provide control over many aspects of the vehicle 500 and its subsystems.

Optionally, one or more of these components above may be installed separately with the vehicle 500 or associated with the vehicle 500. For example, the second memory 552 may exist partially or completely separate from the vehicle 500. The above components may be communicatively coupled together in a wired and/or wireless manner.

Optionally, the above components are just an example. In practical application, components in all the above modules may be added or deleted according to actual needs, and FIG. 5 should not be construed as a limitation on the example of the disclosure.

An automatic driving car traveling on a road, such as the vehicle 500 above, may identify the objects within its surrounding environment to determine an adjustment to the current speed. The objects may be other vehicles, a traffic control device, or other types of objects. In some examples, each identified object may be considered independently, and based on the respective characteristics of the objects, such as its current speed, acceleration, and distance from the vehicle, may be configured to determine the speed at which the automatic driving vehicle is to adjust.

Optionally, the vehicle 500 or perception and computing devices associated with the vehicle 500 (for example, the computing system 531 and the computing platform 550) may predict behavior of the identified objects based on the characteristics of the identified objects and the state of the surrounding environment (for example, traffic, rain, ice on the road, etc.). Optionally, each identified object depends on the behavior of the other, so it is also possible to predict the behavior of the single identified object by considering all the identified objects together. The vehicle 500 can adjust its speed based on the predicted behavior of the identified objects. In other words, the automatic driving car can determine what steady state the vehicle will need to adjust to (for example, accelerate, decelerate, or stop) based on the predicted behavior of the object. In this process, other factors may also be considered to determine the speed of the vehicle 500, such as a lateral location of the vehicle 500 in the road being traveled, a curvature of the road, and proximity of static and dynamic objects.

In addition to providing the instruction to adjust the speed of the automatic driving car, the computing device may further provide the instruction to modify a steering angle of the vehicle 500, so that the automatic driving car follows a given trajectory and/or maintain a safe lateral and longitudinal distance from objects in the vicinity of the automatic driving car (for example, vehicles in adjacent lanes on the road).

The above vehicle 500 may be various types of traveling tools, such as a car, a truck, a motorcycle, a bus, a boat, an airplane, a helicopter, a recreational vehicle and a train, which are not particularly limited in the example of the disclosure.

Those skilled in the art will easily figure out other implementation solutions of the disclosure after considering the specification and practicing the disclosure. The disclosure intends to cover any transformation, usage or adaptive change of the disclosure, and these transformations, usages or adaptive changes conform to a general principle of the disclosure and include common general knowledge or conventional technical means in the technical field not disclosed by the disclosure. The specification and the examples are merely regarded as being for example, and the true scope and spirit of the disclosure are indicated by the following claims.

It should be understood that the disclosure is not limited to the exact structure that has been described above and shown in the accompanying drawings, and that various modifications and changes may be made without departing from the scope of the disclosure. The scope of the disclosure is limited merely by the appended claims.

Additional non-limiting embodiments of the disclosure include:

1. A vehicle traveling control method, including:

determining predicted motion features of a to-be-avoided object within a perception visual field of a vehicle, where the predicted motion features include at least one of the following: a position relationship between a current position of the to-be-avoided object and a traveling lane of the vehicle, whether there is a predicted traveling path intersection between the to-be-avoided object with the vehicle, and a predicted position of the to-be-avoided object at the time that the vehicle decelerates to the predicted traveling path intersection at a maximum deceleration in a case that the predicted traveling path intersection exists;

determining a safety level of the to-be-avoided object relative to the vehicle according to the predicted motion features and preset safety conditions; and determining a target deceleration of the vehicle according to an attribute feature of the to-be-avoided object and the corresponding safety level, and controlling traveling of the vehicle according to the target deceleration.

2. The method according to embodiment 1, the attribute feature includes a type of the to-be-avoided object and a historical motion feature in the perception visual field, and determining the target deceleration of the vehicle according to the attribute feature of the to-be-avoided object and the corresponding safety level includes:

determining a distribution density of other road participants in the perception visual field of the vehicle according to the number of other road participants in the perception visual field of the vehicle and a visual field area of the perception visual field;

determining a motion maneuvering feature of the to-be-avoided object according to the distribution density and the type of the to-be-avoided object;

determining a target avoidance object from the to-be-avoided object according to the motion maneuvering feature of the to-be-avoided object and the corresponding safety level; and determining the target deceleration of the vehicle according to a historical motion feature of the target avoidance object in the perception visual field.

3. The method according to embodiment 2, determining the target avoidance object from the to-be-avoided object according to the motion maneuvering feature of the to-be-avoided object and the corresponding safety level includes:

determining a target safety level where the to-be-avoided object is located from a preset safety level according to the motion maneuvering feature of the to-be-avoided object and the corresponding safety level; and obtaining the target avoidance object by removing a to-be-avoided object whose target safety level is lower than a preset safety level threshold.

4. The method according to embodiment 2, determining the motion maneuvering feature of the to-be-avoided object according to the distribution density and the type of the to-be-avoided object includes:

matching a corresponding predicted moving speed for the to-be-avoided object according to the distribution density and the type of the to-be-avoided object;

determining visual angle information of the to-be-avoided object according to a historical motion track of the to-be-avoided object in the perception visual field; and determining the motion maneuvering feature of the to-be-avoided object according to the predicted moving speed and the visual angle information.

5. The method according to any one of embodiments 1-4, the preset safety conditions include at least one of the following:

whether a current position of the to-be-avoided object is in the traveling lane of the vehicle;

whether the to-be-avoided object has the predicted traveling path intersection with the vehicle;

a distance between the predicted traveling path intersection and the vehicle in a case that the predicted traveling path intersection exists;

whether a distance between the predicted position of the to-be-avoided object and the predicted traveling path intersection meets a preset safety distance at a time of the vehicle decelerating to the predicted traveling path intersection at the maximum deceleration in a case that the predicted traveling path intersection exists.

6. The method according to embodiment 5, there are the plurality of predicted motion features and preset safety conditions, and determining the safety level of the to-be-avoided object relative to the vehicle according to the predicted motion features and the preset safety conditions includes:

determining a safety score corresponding to the predicted motion feature according to whether any predicted motion feature of the to-be-avoided object meets the corresponding safety condition; and determining the safety level of the to-be-avoided object relative to the vehicle through weighted sum according to a weight value preset for each safety condition and the safety score.

7. A vehicle traveling control apparatus, including:

a first determining module, configured to determine predicted motion features of a to-be-avoided object within a perception visual field of a vehicle, where the predicted motion features include at least one of the following: a position relationship between a current position of the to-be-avoided object and a traveling lane of the vehicle, whether there is a predicted traveling path intersection between the to-be-avoided object with the vehicle, and a predicted position of the to-be-avoided object at the time that the vehicle decelerates to the predicted traveling path intersection at a maximum deceleration in a case that the predicted traveling path intersection exists;

a second determining module, configured to determine a safety level of the to-be-avoided object relative to the vehicle according to the predicted motion features and preset safety conditions; and a third determining module, configured to determine a target deceleration of the vehicle according to an attribute feature of the to-be-avoided object and the corresponding safety level, and control traveling of the vehicle according to the target deceleration.

8. The vehicle traveling control apparatus according to embodiment 7, the attribute feature includes a type of the to-be-avoided object and a historical motion feature in the perception visual field, and the third determining module includes:

a density determining submodule, configured to determine a distribution density of other road participants in the perception visual field of the vehicle according to the number of other road participants in the perception visual field of the vehicle and a visual field area of the perception visual field;

a feature determining submodule, configured to determine a motion maneuvering feature of the to-be-avoided object according to the distribution density and the type of the to-be-avoided object;

an object determining submodule, configured to determine a target avoidance object from the to-be-avoided object according to the motion maneuvering feature of the to-be-avoided object and the corresponding safety level; and a deceleration determining submodule, configured to determine the target deceleration of the vehicle according to a historical motion feature of the target avoidance object in the perception visual field.

9. The vehicle traveling control apparatus according to embodiment 8, the object determining submodule is configured to:

determine a target safety level where the to-be-avoided object is located from a preset safety level according to the motion maneuvering feature of the to-be-avoided object and the corresponding safety level; and obtain the target avoidance object by removing a to-be-avoided object whose target safety level is lower than a preset safety level threshold.

10. The vehicle traveling control apparatus acct ding to embodiment 8, the feature determining submodule is configured to:

match a corresponding predicted moving speed for the to-be-avoided object according to the distribution density and the type of the to-be-avoided object;

determine visual angle information of the to-be-avoided object according to a historical motion track of the to-be-avoided object in the perception visual field; and determine the motion maneuvering feature of the to-be-avoided object according to the predicted moving speed and the visual angle information.

11. The vehicle traveling control apparatus according to any one of embodiments 7-10, the preset safety conditions include at least one of the following:

whether a current position of the to-be-avoided object is in the traveling lane of the vehicle;

whether the to-be-avoided object has the predicted traveling path intersection with the vehicle;

a distance between the predicted traveling path intersection and the vehicle in a case that the predicted traveling path intersection exists;

whether a distance between the predicted position of the to-be-avoided object and the predicted traveling path intersection meets a preset safety distance at a time of the vehicle decelerating to the predicted traveling path intersection at the maximum deceleration in a case that the predicted traveling path intersection exists.

12. The vehicle traveling control apparatus according to embodiment 11, there are the plurality of predicted motion features and preset safety conditions, and the second determining module is configured to:

determine a safety score corresponding to the predicted motion feature according to whether any predicted motion feature of the to-be-avoided object meets the corresponding safety condition; and determine the safety level of the to-be-avoided object relative to the vehicle through weighted sum according to a weight value preset for each safety condition and the safety score.

13. An electronic device, including:
a processor; and
a memory for storing an executable instruction of the processor; where
the processor is configured to:
determine predicted motion features of a to-be-avoided object within a perception visual field of a vehicle, where the predicted motion features include at least one of the following: a position relationship between a current position of the to-be-avoided object and a traveling lane of the vehicle, whether there is a predicted traveling path intersection between the to-be-avoided object with the vehicle, and a predicted position of the to-be-avoided object at the time that the vehicle decelerates to the predicted traveling path intersection at a maximum deceleration in a case that the predicted traveling path intersection exists;
determine a safety level of the to-be-avoided object relative to the vehicle according to the predicted motion features and preset safety conditions; and
determine a target deceleration of the vehicle according to an attribute feature of the to-be-avoided object and the corresponding safety level, and control traveling of the vehicle according to the target deceleration.

14. A non-transitory computer readable storage medium, and stores a computer program instruction. The program instruction, in response to being executed by a processor, implements steps of the vehicle traveling control method according to any one of embodiments 1-6.

15. A chip, including a processor and an interface. The processor is configured to read an instruction so as to execute the vehicle traveling control method according to any one of embodiments 1-6.

16. A vehicle, the vehicle includes the vehicle traveling control apparatus according to embodiment 7, or the electronic device according to embodiment 8, or the chip according to embodiment 10.

What is claimed is:

1. A vehicle traveling control method, comprising:
determining predicted motion features of a to-be-avoided object within a perception visual field of a vehicle, wherein the predicted motion features comprise at least one of the following:
a position relationship between a current position of the to-be-avoided object and a traveling lane of the vehicle, whether there is a predicted traveling path intersection between the to-be-avoided object with the vehicle, and
a predicted position of the to-be-avoided object at a time of the vehicle decelerating to the predicted traveling path intersection at a maximum deceleration in a case that the predicted traveling path intersection exists;
determining a safety level of the to-be-avoided object relative to the vehicle according to the predicted motion features and preset safety conditions; and
determining a target deceleration of the vehicle according to an attribute feature of the to-be-avoided object and the corresponding safety level, and controlling traveling of the vehicle according to the target deceleration,
wherein the attribute feature comprises a type of the to-be-avoided object and a historical motion feature in the perception visual field, and determining the target deceleration of the vehicle according to the attribute feature of the to-be-avoided object and the corresponding safety level comprises:

determining a distribution density of other road participants in the perception visual field of the vehicle according to a number of other road participants in the perception visual field of the vehicle and a visual field area of the perception visual field;

determining a motion maneuvering feature of the to-be-avoided object according to the distribution density and the type of the to-be-avoided object;

determining a target avoidance object from the to-be-avoided object according to the motion maneuvering feature of the to-be-avoided object and the corresponding safety level; and determining the target deceleration of the vehicle according to a historical motion feature of the target avoidance object in the perception visual field.

2. The method according to claim 1, wherein determining the target avoidance object from the to-be-avoided object according to the motion maneuvering feature of the to-be-avoided object and the corresponding safety level comprises:

determining a target safety level where the to-be-avoided object is located from a preset safety level according to the motion maneuvering feature of the to-be-avoided object and the corresponding safety level; and obtaining the target avoidance object by removing a to-be-avoided object whose target safety level is lower than a preset safety level threshold.

3. The method according to claim 1, wherein determining the motion maneuvering feature of the to-be-avoided object according to the distribution density and the type of the to-be-avoided object comprises:

matching a corresponding predicted moving speed for the to-be-avoided object according to the distribution density and the type of the to-be-avoided object;

determining visual angle information of the to-be-avoided object according to a historical motion track of the to-be-avoided object in the perception visual field; and determining the motion maneuvering feature of the to-be-avoided object according to the predicted moving speed and the visual angle information.

4. The method according to claim 1, wherein the preset safety conditions comprise:

whether a current position of the to-be-avoided object is in the traveling lane of the vehicle.

5. The method according to claim 1, wherein the preset safety conditions comprise:

whether the to-be-avoided object has the predicted traveling path intersection with the vehicle.

6. The method according to claim 1, wherein the preset safety conditions comprise:

a distance between the predicted traveling path intersection and the vehicle in a case that the predicted traveling path intersection exists.

7. The method according to claim 1, wherein the preset safety conditions comprise:

whether a distance between the predicted position of the to-be-avoided object and the predicted traveling path intersection meets a preset safety distance at the time of the vehicle decelerating to the predicted traveling path intersection at the maximum deceleration in a case that the predicted traveling path intersection exists.

8. The method according to claim 1, wherein there are a plurality of predicted motion features and preset safety conditions, and determining the safety level of the to-be-avoided object relative to the vehicle according to the predicted motion features and the preset safety conditions comprises:

determining a safety score corresponding to the predicted motion feature according to whether any predicted motion feature of the to-be-avoided object meets the corresponding preset safety condition; and determining the safety level of the to-be-avoided object relative to the vehicle through weighted sum according to a weight value preset for each safety condition and the safety score.

9. A chip, comprising a processor and an interface, wherein the processor is configured to read an instruction so as to execute the method according to claim 1.

10. An electronic device, comprising:

a processor; and a memory for storing an executable instruction of the processor; wherein the processor is configured to:

determine predicted motion features of a to-be-avoided object within a perception visual field of a vehicle, wherein the predicted motion features comprise at least one of the following:

a position relationship between a current position of the to-be-avoided object and a traveling lane of the vehicle, whether there is a predicted traveling path intersection between the to-be-avoided object with the vehicle, and a predicted position of the to-be-avoided object at a time of the vehicle decelerating to the predicted traveling path intersection at a maximum deceleration in a case that the predicted traveling path intersection exists;

determine a safety level of the to-be-avoided object relative to the vehicle according to the predicted motion features and preset safety conditions; and determine a target deceleration of the vehicle according to an attribute feature of the to-be-avoided object and the corresponding safety level, and control traveling of the vehicle according to the target deceleration, wherein the attribute feature comprises a type of the to-be-avoided object and a historical motion feature in the perception visual field, and the processor is further configured to:

determine a distribution density of other road participants in the perception visual field of the vehicle according to a number of other road participants in the perception visual field of the vehicle and a visual field area of the perception visual field;

determine a motion maneuvering feature of the to-be-avoided object according to the distribution density and the type of the to-be-avoided object;

determine a target avoidance object from the to-be-avoided object according to the motion maneuvering feature of the to-be-avoided object and the corresponding safety level; and determine the target deceleration of the vehicle according to a historical motion feature of the target avoidance object in the perception visual field.

11. The electronic device according to claim 10, wherein the processor is configured to:

determine a target safety level where the to-be-avoided object is located from a preset safety level according to the motion maneuvering feature of the to-be-avoided object and the corresponding safety level; and obtain the target avoidance object by removing a to-be-avoided object whose target safety level is lower than a preset safety level threshold.

12. The electronic device according to claim 10, wherein the processor is configured to:

match a corresponding predicted moving speed for the to-be-avoided object according to the distribution density and the type of the to-be-avoided object;

determine visual angle information of the to-be-avoided object according to a historical motion track of the to-be-avoided object in the perception visual field; and determine the motion maneuvering feature of the to-be-avoided object according to the predicted moving speed and the visual angle information.

13. The electronic device according to claim 10, wherein the processor is configured to:

the preset safety conditions comprise:

whether a current position of the to-be-avoided object is in the traveling lane of the vehicle.

14. The electronic device according to claim 10, wherein the processor is configured to:

the preset safety conditions comprise:

whether the to-be-avoided object has the predicted traveling path intersection with the vehicle.

15. The electronic device according to claim 10, wherein the processor is configured to:

the preset safety conditions comprise:

a distance between the predicted traveling path intersection and the vehicle in a case that the predicted traveling path intersection exists.

16. The electronic device according to claim 10, wherein the processor is configured to:

the preset safety conditions comprise:

whether a distance between the predicted position of the to-be-avoided object and the predicted traveling path intersection meets a preset safety distance at the time of the vehicle decelerating to the predicted traveling path intersection at the maximum deceleration in a case that the predicted traveling path intersection exists.

17. A vehicle, comprising the electronic device according to claim 10.

18. A non-transitory computer readable storage medium, storing a computer program instruction, wherein the program instruction, in response to being executed by a processor, implements a vehicle traveling control method:

determining predicted motion features of a to-be-avoided object within a perception visual field of a vehicle, wherein the predicted motion features comprise at least one of the following:

a position relationship between a current position of the to-be-avoided object and a traveling lane of the vehicle, whether there is a predicted traveling path intersection between the to-be-avoided object with the vehicle, and a predicted position of the to-be-avoided object at a time of the vehicle decelerating to the predicted traveling path intersection at a maximum deceleration in a case that the predicted traveling path intersection exists;

determining a safety level of the to-be-avoided object relative to the vehicle according to the predicted motion features and preset safety conditions; and determining a target deceleration of the vehicle according to an attribute feature of the to-be-avoided object and the corresponding safety level, and controlling traveling of the vehicle according to the target deceleration, wherein the attribute feature comprises a type of the to-be-avoided object and a historical motion feature in the perception visual field, and the program instruction further implements:

determining a distribution density of other road participants in the perception visual field of the vehicle according to a number of other road participants in the perception visual field of the vehicle and a visual field area of the perception visual field;

determining a motion maneuvering feature of the to-be-avoided object according to the distribution density and the type of the to-be-avoided object;

determining a target avoidance object from the to-be-avoided object according to the motion maneuvering feature of the to-be-avoided object and the corresponding safety level; and determining the target deceleration of the vehicle according to a historical motion feature of the target avoidance object in the perception visual field.

* * * * *

UNITED STATES PATENT AND TRADEMARK OFFICE
CERTIFICATE OF CORRECTION

| | | |
|---|---|---|
| PATENT NO. | : 12,448,002 B2 | Page 1 of 1 |
| APPLICATION NO. | : 18/072200 | |
| DATED | : October 21, 2025 | |
| INVENTOR(S) | : Liang Shi et al. | |

It is certified that error appears in the above-identified patent and that said Letters Patent is hereby corrected as shown below:

In the Specification

In Column 11, Line 55, delete "processor" and insert -- processors --, therefor.

In Column 13, Line 37, delete "(ICU)" and insert -- (IMU) --, therefor.

In Column 19, Line 28, delete "acct ding to" and insert -- according to --, therefor.

Signed and Sealed this
Sixteenth Day of December, 2025

John A. Squires
*Director of the United States Patent and Trademark Office*